United States Patent [19]

Smith et al.

[11] 4,263,713

[45] Apr. 28, 1981

[54] APPARATUS FOR ACTUATING AND EXTRACTING A TUBE GUIDE-EXPANDER

[75] Inventors: Edward H. Smith, Plum Borough; Richard L. Stiller, Natrona Heights; Robert Shaffer, Swissvale, all of Pa.

[73] Assignee: Westinghouse Electric Corp., Pittsburgh, Pa.

[21] Appl. No.: 951,927

[22] Filed: Oct. 16, 1978

[51] Int. Cl.$^2$ .............................................. B23P 19/04
[52] U.S. Cl. ...................................... 29/727; 29/252; 29/282; 279/22; 279/76
[58] Field of Search ................ 29/726, 727, 252, 282, 29/157.3 C; 72/453.01, 391; 279/19.4, 22, 30, 76, 78, 82

[56] References Cited

U.S. PATENT DOCUMENTS

| | | | |
|---|---|---|---|
| 2,135,861 | 11/1938 | Thompson | 279/76 |
| 2,751,229 | 6/1956 | Schultz | 279/22 |
| 3,585,701 | 6/1971 | Stary | 29/727 |
| 3,791,011 | 2/1974 | Keys | 29/252 |
| 3,835,520 | 9/1974 | Sismore | 29/726 |
| 3,854,314 | 12/1974 | Martin | 29/727 |
| 4,068,372 | 1/1978 | Kamohara et al. | 29/727 |

*Primary Examiner*—Milton S. Mehr
*Attorney, Agent, or Firm*—G. H. Telfer

[57] ABSTRACT

An apparatus for actuating a tube guide expander device inserted in a tube end and extracting it therefrom subsequent to tube expansion induced by guide-expander actuation. The apparatus includes inner and outer sleeve structures which are independently axially displaceable relative to the tube and guide-expander. The outer sleeve structure is engageable with a first compression structure of the device to secure it and its engaged tube in place during relative axial displacement of a second compression structure of the device.

Selectively coupling the inner sleeve structure to the device's second compression structure and axial displacement of both axially compresses a radial expansion element situated between the compression structures and expands the enclosing tube. A series of balls are radially displaceable from an outer unobstructing position through radial openings in the inner sleeve structure and an intermediate sleeve structure to an inner obstructing position protruding into the inner sleeve structure's bore so as to axially engage a portion of the second compression structure and prevent its extraction from the bore during axial displacement of the inner sleeve structure. Radial displacement of the balls is provided by selective axial displacement of the intermediate sleeve structure arranged about the inner sleeve structure. Simultaneous axial displacement of the inner and outer sleeve structures away from the tube with the balls in obstructing position subsequent to the tube's expansion enables extraction of the guide-expander from the tube.

14 Claims, 17 Drawing Figures

APPARATUS FOR ACTUATING AND EXTRACTING A TUBE GUIDE-EXPANDER

CROSS REFERENCE TO RELATED APPLICATIONS

The present invention is related to commonly assigned, copending application Ser. Nos. 955,688 and 965,016 and, whose respective filing dates are Oct. 30, 1978 and Nov. 30, 1978.

BACKGROUND OF THE INVENTION

1. Field of the Invention

This invention relates to the expansion of tubes in shell and tube heat exchanger tubesheets, and more particularly, to means for actuating and extracting tube guide-expander devices releasably retained in and protruding from the ends of the tubes.

2. Description of the Prior Art

Expanding tubes into contact with tubesheet apertures may be accomplished by the use of rolling tools, hydraulic expanders such as those described in commonly-assigned, allowed application Ser. No. 810,817, filed June 28, 1977, and other conventional means. The hydraulic tube expansion is performable after guiding the tubes into the appropriate tubesheet apertures and removing the tube guides from their ends. Commonly assigned, copending application Ser. No. 898,348, filed Apr. 21, 1978, describes bristled tube guides and apparatus for extracting them from the tubes prior to tube expansion. While removal of such bristled tube guides and subsequent expansion of the enclosing tubes would normally be performed manually by workmen from the inside of a channel head on the primary side of the tubesheet, repair or replacement of tubes in heat exchangers previously subjected to hazardous fluids such as the radioactive environment of nuclear steam generators necessitate minimizing workmen's exposure to the radioactivity.

Removal of the bristled tube guides prior to hydraulic or other tube expansion techniques require positioning the extraction and expansion tools in separate operations on each tube. Positioning and supporting such tools is preferably accomplished by a multi-purpose, remotely operated $R\theta$ machine as disclosed in commonly-assigned copending application Ser. No. 888,701, filed Mar. 21, 1978. While drastically reducing workmen exposure time to the radioactive environment, use of the aforementioned bristled tube guide, extraction apparatus therefor, and hydraulic tube expander require at least one manual tool change for the $R\theta$ machine. During such tool change, the workman is subjected to radioactive exposure.

To further minimize workmen exposure to radioactivity a dual-duty guide expander was developed and is described in commonly assigned, copending application Ser. No. 955,688 filed Oct. 30, 1978. To effectively utilize such tube guide expander, development of an apparatus for actuating and extracting it from the tube was required.

SUMMARY OF THE INVENTION

In accordance with the present invention, an apparatus is provided for actuating and extracting a tube guide-expander device previously inserted in an open end of the tube prior to its insertion through a heat exchanger tubesheet. The invention generally comprises a structure for axially displacing a driving element of the guide-expander and a structure for securing a thrust portion of the guide-expander in fixed abutting relationship with the tube's end. The invention is supported and positioned by an R machine as described in Ser. No. 888,701, filed Mar. 21, 1978.

The preferred embodiment of the invention utilizes an outer sleeve structure for axially engaging the device's thrust portion and maintaining it and the enclosing tube in the desired configuration with the tubesheet. Axial displacement of the outer sleeve structure preferably obtains from moving the tool support table of the $R\theta$ machine. The desired tube-to-tubesheet configuration is preferably provided by axially displacing the outer sleeve structure until it contacts the device's thrust portion and the heat exchanger's tubesheet. The axial displacing structure for the device's driving element preferably constitutes a hydraulic cylinder.

The driving element's axial displacing structure preferably constitutes an inner sleeve structure having an internal bore with a reception end for receiving the driving element and a mechanism for selectively coupling the driving element to the inner sleeve structure. The inner sleeve structure further includes a multitude of radial openings extending therethrough. The coupling mechanism includes balls situated in those openings which are displaceable between radially inner and outer positions. Balls occupying the inner position protrude into the inner sleeve structure's bore and overlap with the device's driving element so as to obstruct axial withdrawal of the driving element from the bore during axial displacement of the inner sleeve structure away from the tubesheet. Balls situated in the outer position are radially-separated from the driving element so as to permit unrestrained relative axial displacement between the inner sleeve structure and driving element for receiving and expelling the driving element from the inner sleeve structure's bore.

An axially displaceable intermediate sleeve structure concentrically arranged about the inner sleeve structure constitutes a part of the coupling mechanism and includes radial openings therein which, when axially aligned with the inner sleeve structure's openings, cooperate therewith to permit radial displacement of the balls into their radially outer, unobstructing position. Radially outer displacement of the balls is preferably induced during the opening's axial alignment by a tapered constuction of the inner sleeve structure's radial openings. Such tapered radial openings have a larger axial expanse at the inner sleeve structure's radially outer surface than at its radially inner surface. When the tubes and guide-expanders supported thereby extend vertically, the outer axial expanse of the inner sleeve structure's opening extends lower than the axial expanse of the same opening at the radially inner surface. As such gravity aids in displacing the balls to their radially outer, unobstructing positions when the respective openings of the inner and the intermediate sleeve structures are aligned.

The inner sleeve structure is axially displaceable by a hydraulic cylinder connected therewith. Another axial displacing means such as an air cylinder is disposed to move with the inner sleeve structure. A piston structure associated with and axially displaceable relative to the air cylinder includes an actuating pin which radially extends through axially elongated slots formed in the inner and the intermediate sleeve structures. Axial displacement of the piston structure toward the tube end permits axial displacement of the intermediate sleeve structure for a predetermined distance in the same direction. The predetermined distance is established by a radially-outwardly extending collar portion of the intermediate sleeve structure which is engageable with a radially inwardly-extending shoulder portion of the outer sleeve structure. The intermediate sleeve structure is preferably biased in the axial direction toward the tube and the position of radial opening alignment. Upon engagement of the intermediate sleeve structure's collar with the outer sleeve structure's shoulder, the radial openings align so as to permit radial displacement of the balls to their outer, unobstructing position and permit relative axial movement of the driving element into and/or out of the inner sleeve structure's bore.

Displacement of the balls in the radially inward direction obtains from misaligning the inner and intermediate sleeve structure's radial openings so as to force the balls radially inwardly. The ball's occupation of such inner position obstructs axial withdrawal of the driving element from the inner sleeve structure's bore during axial displacement of the inner sleeve structure away from the tube. During such obstructive disposition of the balls and axial displacement of the inner sleeve structure away from the tubesheet, relative axial displacement of the guide-expander's thrust portion and driving element obtains resulting in radial enlargement of the device's expansion means which, in turn, radially expand the tube. After tube expansion, axial displacement of the inner sleeve structure and coupled driving element towards the tubesheet to their pre-tube expansion positions facilitates tube guide-expander extraction from the expanded tube end. Extraction thereof obtains by simultaneously axially displacing the outer sleeve structure and inner sleeve structure away from the tube and tubesheet with the balls situated in the axially obstructing position. After such guide-expander extraction, the inner sleeve structure is rotated about an axis perpendicular to its bore's longitudinal axis from its extraction position and the air cylinder's piston structure is axially displaced towards the inner sleeve structure's reception end. Axial displacement of the piston structure is limited by the actuating pin's engagement with the end of the inner sleeve structure's slot. Such axial displacement of the air cylinder's piston structure initially permits alignment of the inner and intermediate sleeve structures' openings and radial displacement of the balls therein to their unobstructing position. Further axial displacement of the air cylinder's piston structure to the end of the slot results in its abutment with the device's driving element and expulsion thereof from the inner sleeve structure's bore. Rotation of the inner sleeve structure to its extraction position, retraction of the inner sleeve structure from the tubesheet, withdrawal of the piston structure to a position corresponding to radial opening alignment, and subsequent indexing of the R$\theta$ machine and the supported present invention to a yet unexpanded tube end permits repetition of the aforementioned series of operations.

BRIEF DESCRIPTION OF THE DRAWINGS

The objects and advantages of this invention will become more apparent from the following detailed description in connection with the accompanying drawings, in which.

DESCRIPTION OF THE PREFERRED EMBODIMENT

Figure 1A:
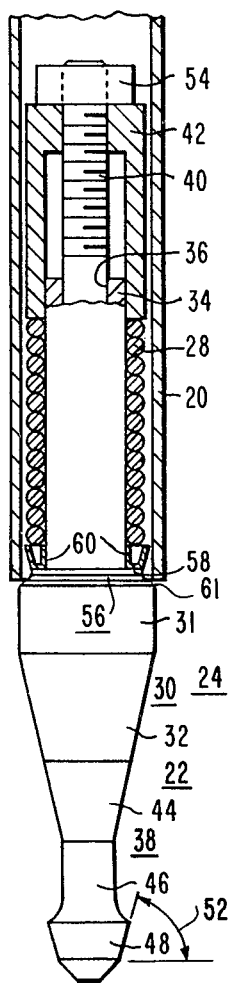
FIGS. 1A and 1B are partial sectional views of a tube guide-expander respectively inserted in and secured against the inner surface of a tube.

Referring now to the drawings in detail, FIG. 1A shows a partial sectional view of a tube 20 with a tube guide-expander 22 inserted in an open end thereof. Tube guide-expander 22 has first and second compression structures 24 and 26 and radial expansion means such as the illustrated elastomeric O-rings 28 axially disposed between portions of both compression structures. First compression structure 24 includes a tube thrust portion 30 which constitutes abutting and tapered components 31 and 32, respectively. Sleeve portion 34 is preferably attached to thrust portion 30 and is insertable within tube 20 so as to provide radially inner support for O-rings 28. Opening 36 extends axially through and is radially bounded by sleeve portion 34 and thrust portion 30. The second compression structure 26 includes driving element 38, elongated element 40 and ram element 42. Driving element 38 constitutes a tapered portion 44, a stem portion 46, and a tip portion 48. Elongated element 40 extends through the first compression structure's opening 36 and is connected to the driving and ram elements 38 and 42 respectively on its opposite ends. The outer periphery of tapered portion 44 cooperates with the outer periphery of tapered component 32 in providing a smooth transition surface of decreasing diameter in a direction from the tube thrust portion 30 to stem portion 46. Tip portion 48 preferably includes at least two taper angles 50 and 52 which are, by example, 15 degrees and 45 degrees respectively as mearured from the horizontal. Trailing angle 52 is greater than leading angle 50 so as to minimize the material needed in tip portion 48 and improve guidance over a tip portion having only a single taper angle.

Figure 3:
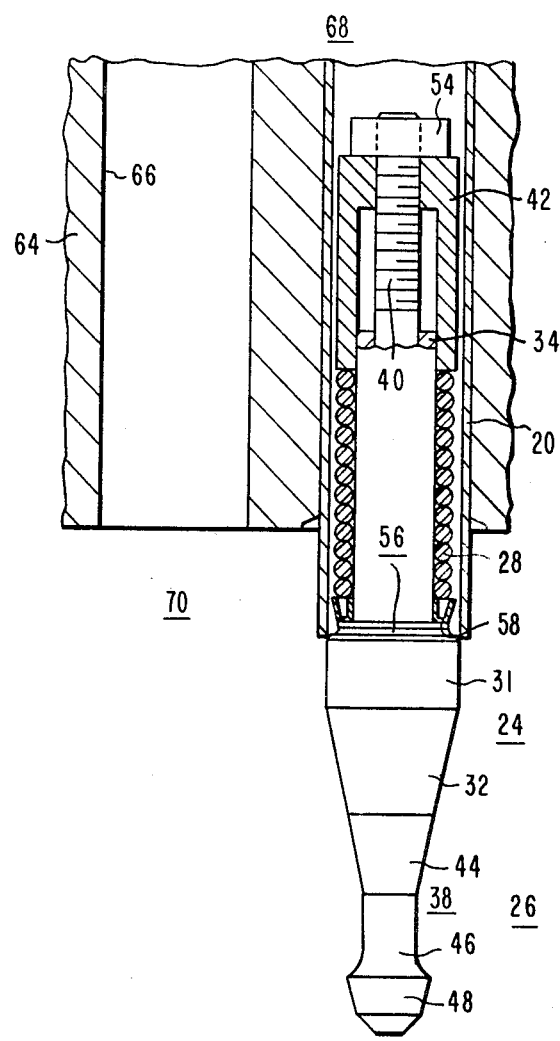
FIG. 3 is a partial sectional view of the guide-expander and attached tube inserted through a heat exchanger tube sheet.

Ram element 42 is preferably disposed in threaded engagement with elongated element 40 so as to be axially displaceable relative thereto when relatively rotated. Frictional axial engagement of ram 42 with O-rings 28 restrains ram rotation during rotation of driving element 38 and connected elongated element 40 and provides such relative axial displacement. Radial expansion means such as O-rings 28 respond to such axial displacement induced compression by radially expanding (as shown in FIG. 3) into contact with tube 20's inside surface. Stopping structure 54 prevents threaded disengagement between ram and elongated elements 42 and 40, respectively, and preferably constitutes a nut in threaded engagement with elongated element 40. A spring pin (not shown) or other device is preferably radially inserted into elongated element 40 and nut 54 to prevent relative rotation therebetween. Transition portion 56 of first compression structure 24 extends radially beyond sleeve portion 34 to form an axially supportive platform 58 for seals 60 which prevent axial flow of elastomeric O-rings 28 therebeyond and optimize their radial expansion during axial compression thereof. The radially outer periphery of transition portion 56 tapers outwardly from the seal support platform 58 to the tube thrust portion 30. The radially outward taper of transition portion 56 constitutes a positioning surface 61 preferably in the configuration of one or more radii and facilitates coaxial assembly of O-rings 28 within tube 20 and axial abutment of thrust portion 30 against the end of tube 20.

Figure 1B:
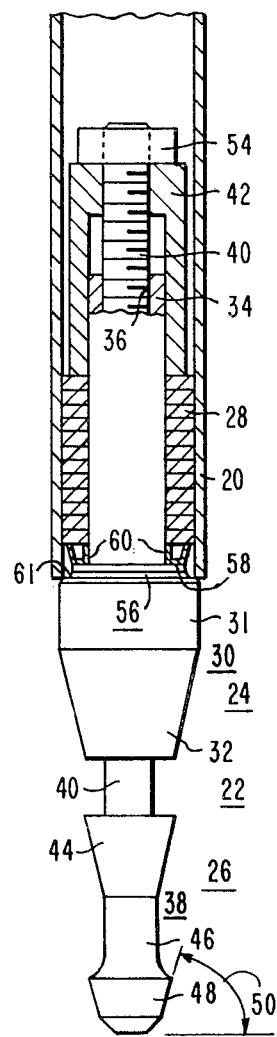

FIG. 1B illustrates tube guide-expander 22 held in engagement with tube 20 by radially expanded O-rings 28. Such engagement obtains from inserting the guide-expander 22 into tube 20 and suitably rotating drive element 38 relative to thrust portion 30. Such relative rotation provides the axial compression and radial expansion of O-rings 28 into engagement with tube 20's inner surface. Such engagement frictionally resists extraction of guide-expander 22 from tube 20 during its subsequent insertion through generally aligned tube support and tube sheet apertures. The radial expansion force of O-rings 28 is adjustable to provide the desired extent of frictional retention of guide-expander 22 within tube 20. Such compression induced expansion force should be less than the force needed to radially expand the tube since such tube expansion would inhibit the tube's insertion through the tube support and tube sheet apertures.

Figure 2:
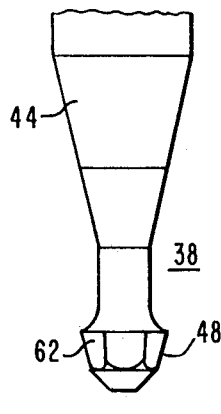
FIG. 2 is a partial sectional view of an alternate embodiment of the preferred guide-expander.

FIG. 2 illustrates an alternate embodiment of the guide-expander 22 disposed in a position analogous to that of FIG. 1A in which the guide-expander 22 has been inserted in tube 20, but is not in securing engagement therewith. The primary difference between the embodiments shown in FIG. 1A and FIG. 2 is that the embodiment of FIG. 2 has planes 62 formed on its tip portion 48 for engagement with a wrench. Such wrench engagement facilitates relatively rotating operationally exposed driving element 38 and tubularly housed ram 42 so as to axially compress and radially expand elastomeric O-rings 28.

FIG. 3 is a partial sectional view of a tube sheet 64 having openings 66 formed therethrough. Tube 20 and associated guide-expander 22 have been inserted through one of the openings 66 from the shell or secondary side 68 to the primary or tube side 70. Tube side 70 is normally at least partially enclosed so as to manifold fluids transmitted thereto and distribute them into the tubes communicating therewith. Such enclosure is normally obtained with a channel head structure (not shown). It is to be understood that tubes 20 may be U-shaped and thus require installation of tube guide-expanders 22 in both tube legs' open ends which must be simultaneously inserted through generally aligned tube support and tube sheet apertures. In the case of U-shaped tubes, the channel head will be partitioned into at least two manifolds—first and second tube leg communicating volumes. Inserting a U-tube and tube guide-expanders 22 installed therein through the tube sheet 64 will result in one of the tube's legs protruding a further and one a lesser distance beyond the primary side 70.

Further axial compression of O-rings 28 beyond their desired frictional retention extent causes further radial expansion thereof and eventual plastic radial expansion of the tube 20 into contact with opening 66. Such axial O-ring 28 compression may result from additional relative rotation of driving element 38 and ram element 42 or relative axial displacement of the first and second compression structures 24 and 26, respectively. Actuation of the guide-expander 22 is accomplished from the tube sheet's primary side 70 which may constitute, as in the case of a nuclear steam generator, a radioactive environment. As such, actuation, manipulation, and extraction of the guide-expander device 22 will preferably be attained through the use of a remotely controlled apparatus such as an actuator-extractor apparatus 72 illustrated in FIGS. 4A and 4B. Relative axial displacement between the device's first and second compression structures was judged more desirable than relative rotation between ram 42 and driving element 38 primarily due to the simpler engagement technique required for axial displacement.

While the remaining illustrations show a single tube and attached guide-expander 22 associated with a single actuating-extractor apparatus, it is to be understood that for U-tube applications, one actuator-extractor apparatus 72 must be operable in each channel head manifold. In other words, for a heat exchanger having a single partition plate (not shown) in the channel head and having U-tubes whose respective legs are associated with the respective manifolds of the channel head, two such actuator-extractor apparatus 72 are required—one on either side of the partition plate. It is to be understood that apparatus 72 is positioned and supported by a tool support apparatus (hereafter referred to as an $R\theta$ machine) as described in commonly-owned copending patent applications, Ser. No. 888,701 filed Mar. 21, 1978 and Ser. No. 896,530, filed Apr. 14, 1978, each of which is herein incorporated by reference to the extent that the present invention requires a movable tool support-positioning mechanism. Thus, the number of $R\theta$ machines, as disclosed in the aforementioned applications, is equal to the number of actuator-extractor apparatus 72 which are utilized. Apparatus 72 generally includes an axially displaceable outer sleeve structure 74, for selectively maintaining thrust portion 30 of guide-expander 22 in abutting relationship with the tube 20, an axially displaceable inner sleeve structure 76, and a coupling or grasping mechanism for selectively linking driving element 38 of guide-expander 22 to inner sleeve structure 76. Hydraulic cylinder 78 is connected with and provides axial displacement of inner sleeve structure 76.

Figure 4A:
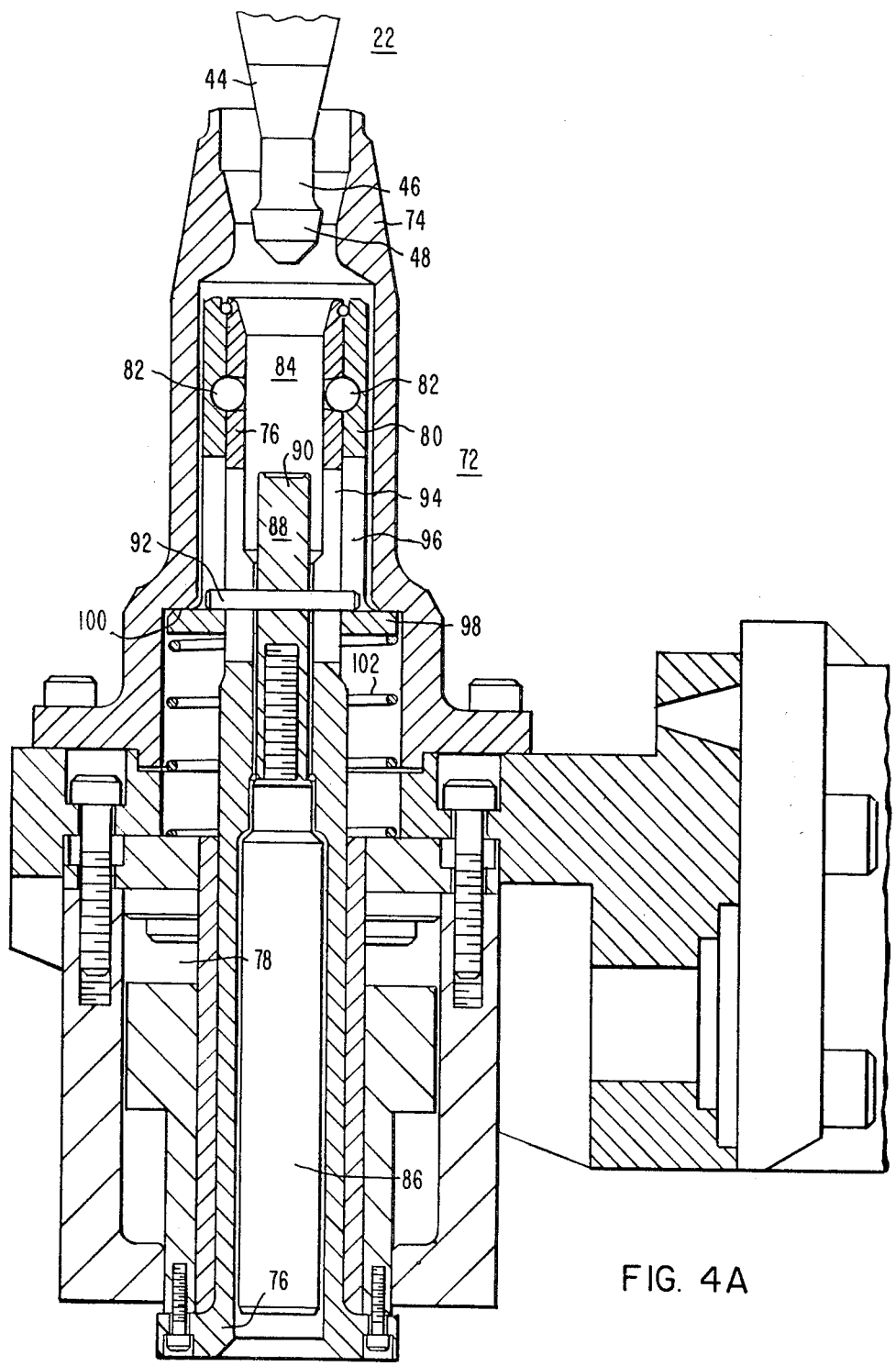
FIGS. 4A and 4B are partial sectional views of an actuating-extraction apparatus illustrating its operative approach configuration for the reception of the tube guide-expander.
Figure 4B:
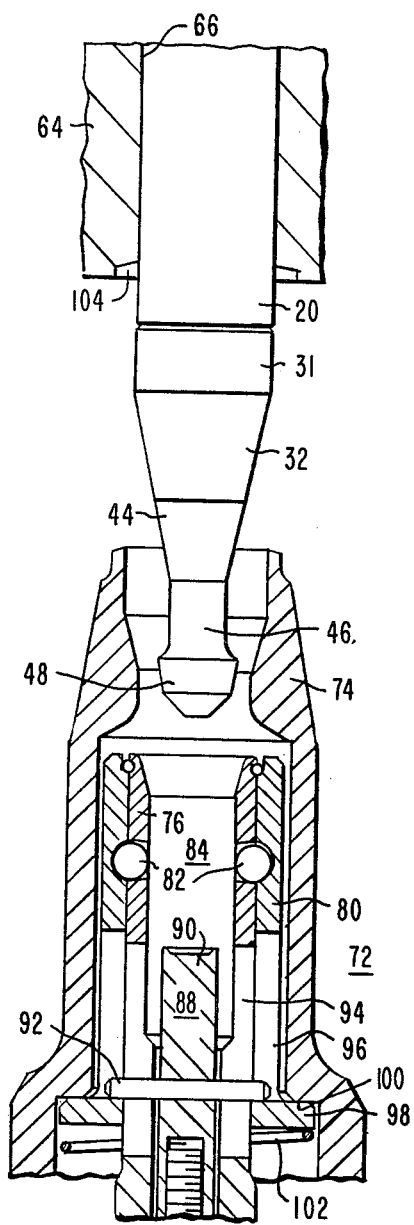

As shown in FIGS. 4A and 4B, apparatus 72 is initially positioned coaxially with guide-expander 22 by an $R\theta$ machine (not shown) prior to being axially displaced toward tube sheet 64. The coupling mechanism includes a plurality (4 by example) of radial openings in inner sleeve structure 76, an equal number of radial openings in an intermediate sleeve structure 80 circumferentially disposed about in closely spaced radial relation with inner sleeve structure 76, and ball detents 82 radially displaceable in the openings. When the radial openings of inner and intermediate sleeve structures 76 and 80, respectively, are aligned, the ball detents 82 will move to a radially outer position as shown in FIGS. 4A and 4B. When situated in the illustrated, unobstructing position, balls 82 permit axial entry of guide-expander device 22 into bore 84 of inner sleeve structure 76. During axial alignment of the inner and intermediate sleeve structure's radial openings, radial displacement of balls 82 to their unobstructing positions is ensured by providing the inner sleeve structure's radial openings with an axial expanse at the inner sleeve structure 76's outer periphery which is greater than the opening's axial expanse at inner sleeve structure 76's inner surface. The radial openings in intermediate sleeve structure 80 cooperate with inner sleeve structure 76's radial openings when aligned therewith to permit radial displacement of balls 82 such that the radially inner extent of balls 82 is preferably outside the bore 84 of inner sleeve structure 76. To provide axial alignment between the radial openings, axial displacing means such as air cylinder 86 is supported within and moves with inner sleeve structure 76. Air cylinder 86 includes piston structure 88 which is axially displaceable relative to inner sleeve structure 76. Piston structure 88 includes abutting element 90 and radial actuating pin 92 which extends through slots 94 and 96 respectively formed in the inner and intermediate sleeve structures. Axial alignment of the sleeve structures' radial openings is ensured by axially displacing piston structure 88 until alignment collar 98 attached to intermediate sleeve structure 80 engages shoulder 100 attached to outer sleeve structure 74. Pin 92 restrains axial movement of intermediate sleeve structure 80 against biasing spring 102 until collar 98 engages shoulder 100. Axial displacement of piston structure 88 toward guide-expander 22 beyond the position corresponding to engagement between collar 98 and shoulder 100 will be described later in conjunction with ejection of guide-expander 22 from apparatus 72.

Figure 5:
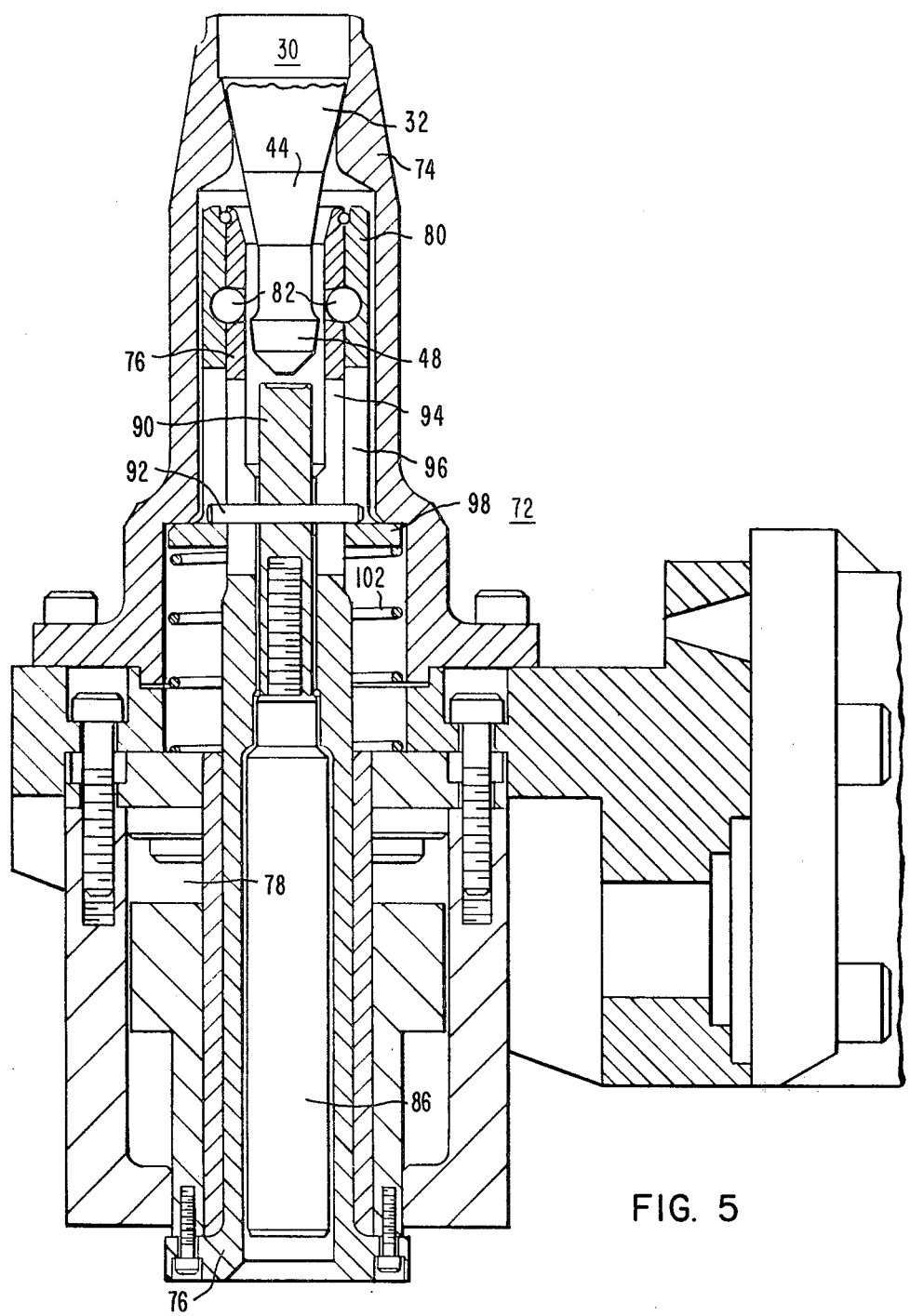
FIGS. 5, 6, 7A, 7B, 7C, 8A, 9B, 10A, 10B, and 11 are partial sectional views of the guide-expander and actuating-extraction apparatus therefor sequentially illustrating the actuation, expansion, and extraction of the guide-expander.

FIG. 5 illustrates initial contact of outer sleeve structure 74 with the tapered component 32 of thrust portion 30. When inner sleeve structure 76 is in its illustrated furthest extended position and balls 82 are in their unobstructing, uncoupled configuration, outer sleeve structure 74 will engage guide expander 22's tapered component 32 shortly after tip portion 48 thereof passes into bore 84 axially beyond the aligned radial openings and their associated balls 82. Additional displacement of apparatus 72 toward tubesheet 64 by the Rθ machine provides simultaneous axial displacement of the guide-expander 22 and engaged tube 20. The desired configuration between tube 20 and tube sheet 64 is provided by terminating axial displacement of apparatus 72 upon its engagement with tube sheet 64.

Such engagement between apparatus 72 and tube sheet 64 preferably occurs when outer sleeve structure 74 axially abuts the boundary of counter bore 104 previously formed on primary side 70 of tube sheet 64 about each opening 66 therein. Counter bore 104 is shown by way of example and is not a required surface preparation for the utilization of disclosed apparatus 22 and 72. Since the tube 20 is in a known, abutting configuration with thrust portion 30 of guide-expander 22, since guide-expander 22 is in a known, abutting configuration with actuator-extractor apparatus 72, since actuator-extractor apparatus 72 is in a known, abutting configuration with tube sheet 64, tube 20 can be considered to be in the desired configuration with tube sheet 64. Appropriate alteration of any or all the aforementioned parts and apparatus can be provided to obtain the desired tube-to-tube sheet configuration such as shortening outer sleeve structure 74 in the absence of counter bore 104.

Figure 6:
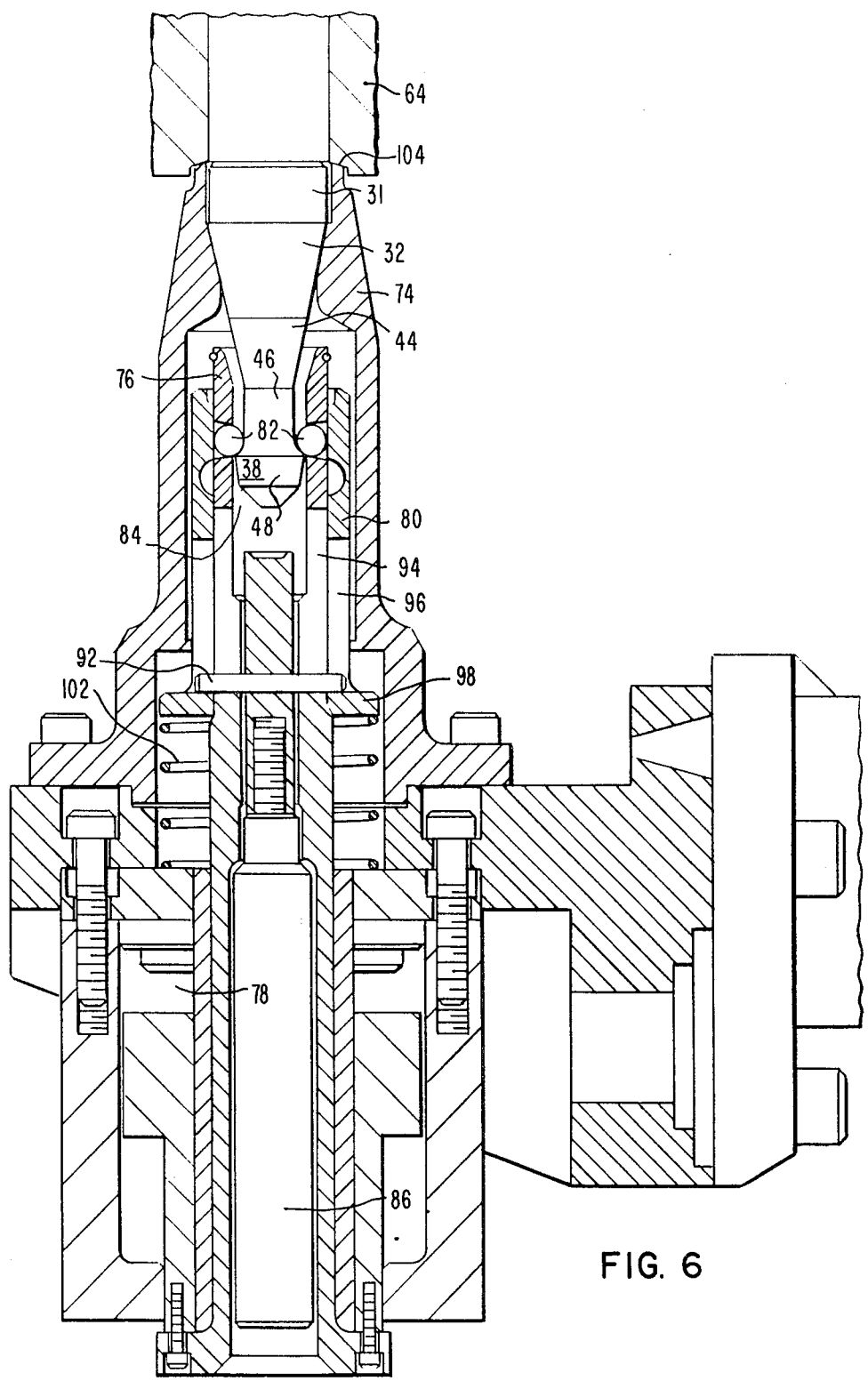

FIG. 6 illustrates apparatus 72 engaged with guide-expander 22 and tube sheet 64. Intermediate sleeve structure 80 has been axially retracted from tube sheet 64 causing radial displacement of balls 82 into their radially inner, obstructing relation with tip portion 48 of driving element 38 to prevent withdrawal thereof from bore 84. Intermediate sleeve structure 80 is retractable by axial displacement of radial actuating pin 92 which axially engages the lower end of slot 96 and thus disengages collar 98 from shoulder 100 and misaligns the radial openings in intermediate sleeve structure 80 from those of inner sleeve structure 76 against the biasing force of spring 102.

Figure 7A:
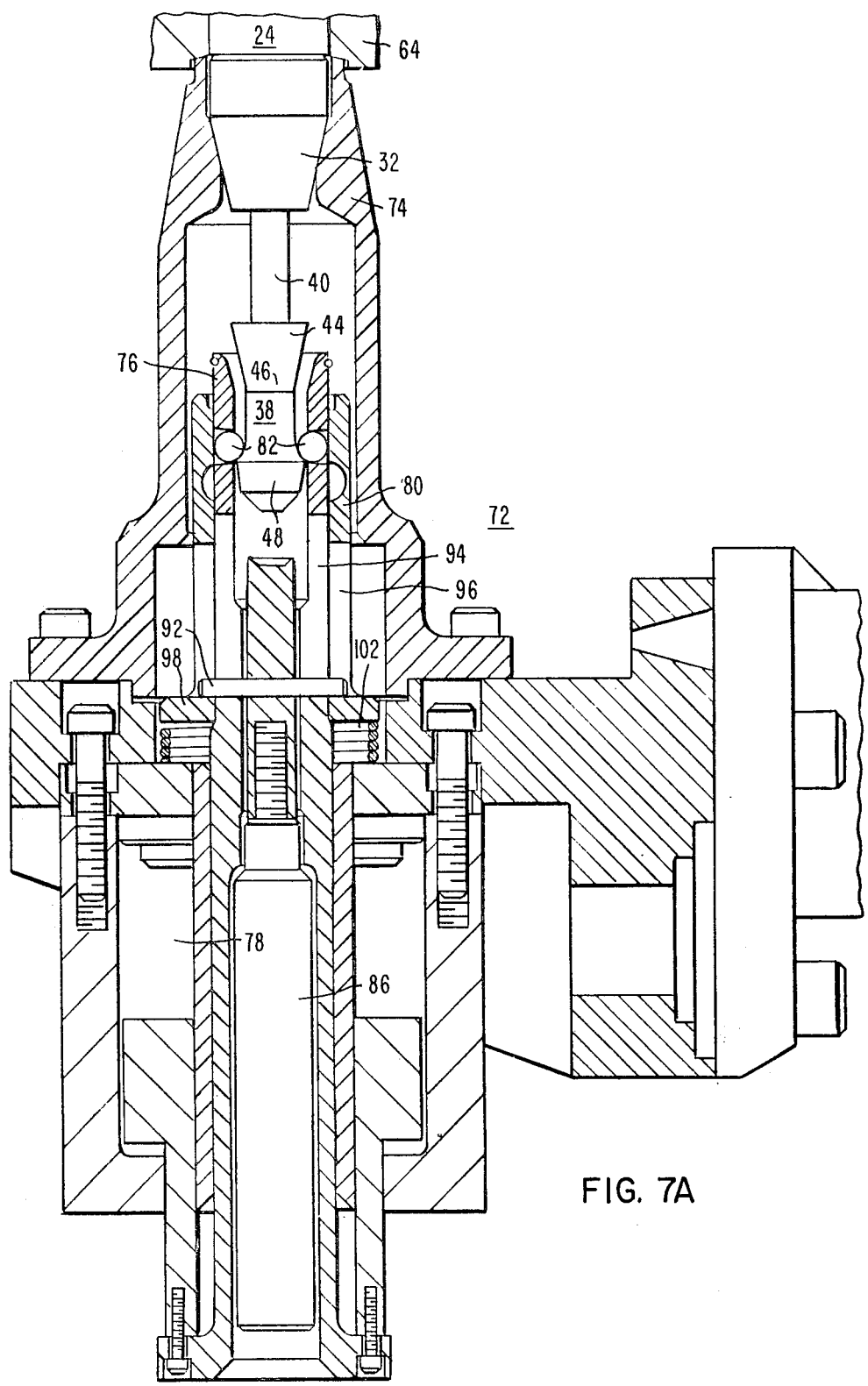
Figure 7B:
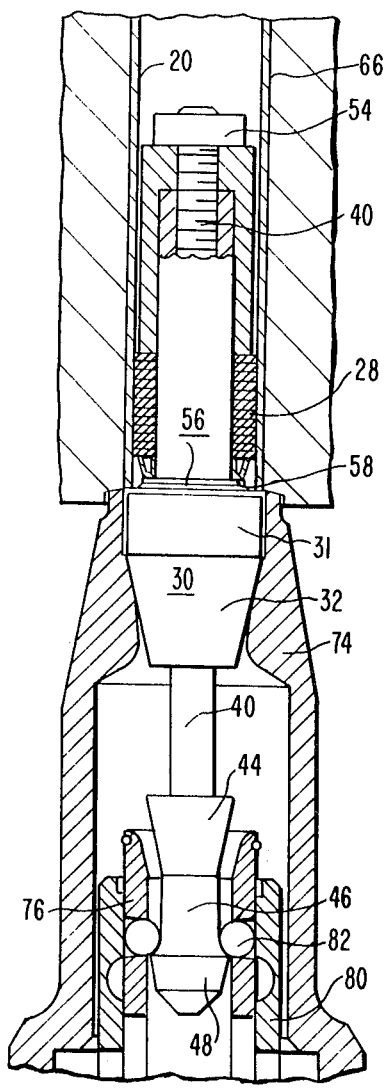
Figure 7C:
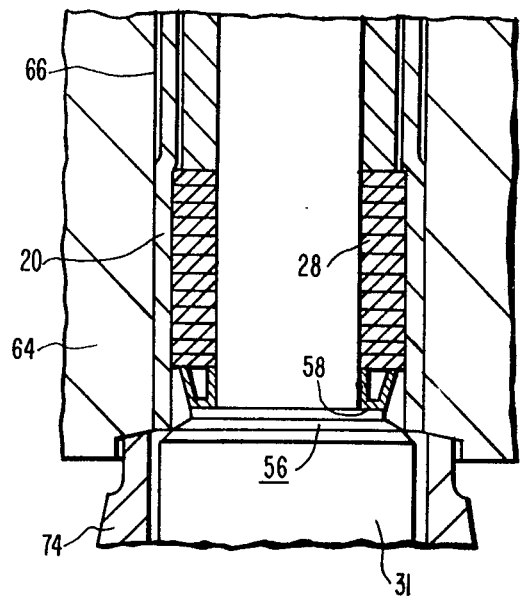

FIGS. 7A through 7C are partial sectional views of the actuator-extractor apparatus 72 in actuating engagement with guide-expander 22. FIG. 7A illustrates hydraulic cylinder 78 and connected inner sleeve structure 76 in their retracted positions in which driving element 38 and attached elongated element 40 are axially displaced relative to the first compression structure 24. When hydraulic cylinder 78 is retracted, balls 82 prevent withdrawal of driving element 38 from bore 84. Intermediate sleeve structure 80 is simultaneously axially retracted with the inner sleeve structure 76 by radial actuating pin(s) 92 which links the supported air cylinder 86 with intermediate sleeve structure 80. Spring 102 is axially compressed by the retraction of the intermediate sleeve structure 80 away from tube sheet 64. FIGS. 7B and 7C are partial sectional views of guide-expander 22's engagement with actuator-expander 72 and the radially expansible O-rings 28 in engagement with expanded tube 20, respectively. As can be seen in FIG. 7C, O-rings 28 have been axially compressed beyond their securing configuration of FIG. 1A and respond thereto by radially plastically expanding tube 20 against the wall of aperture 66.

Figure 8A:
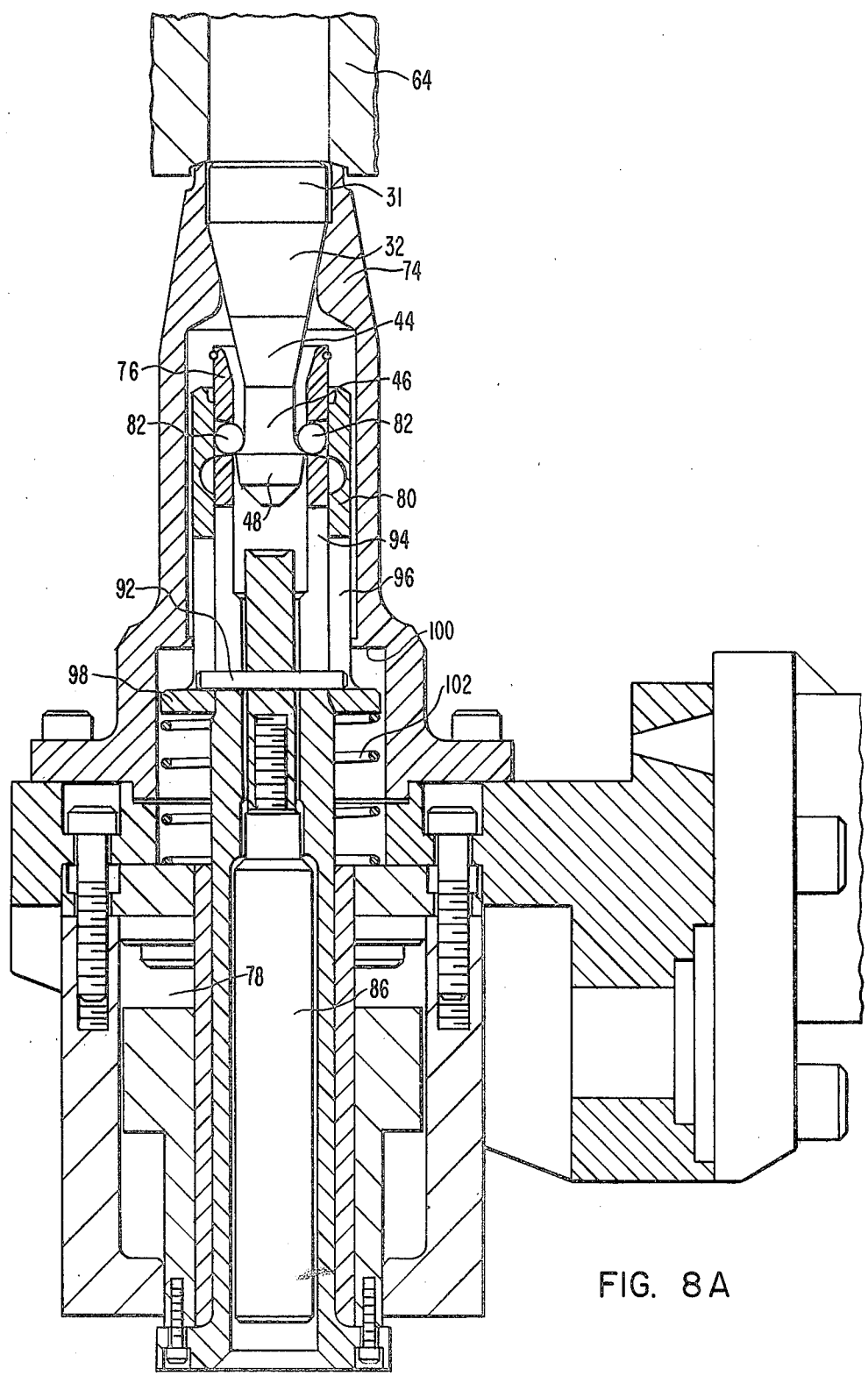
Figure 8B:
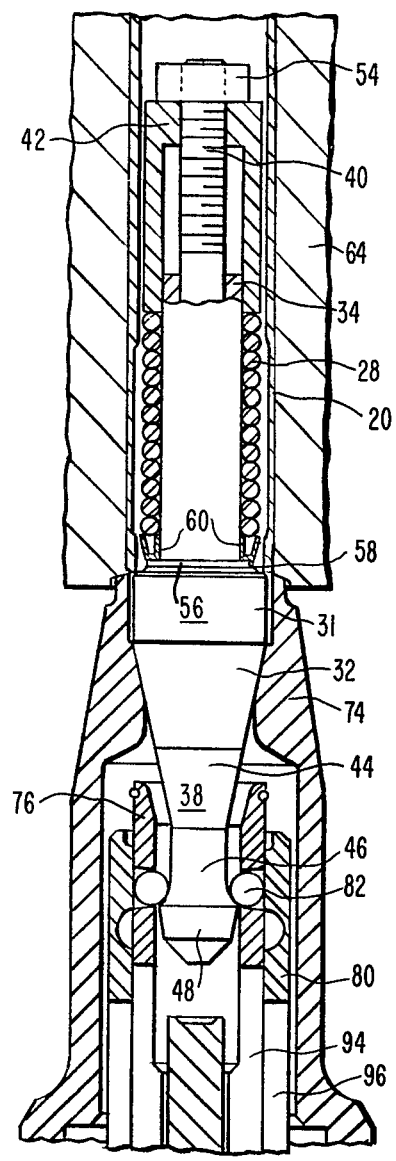

FIG. 8A is a partial sectional view of apparatus 22 and apparatus 72 illustrating a relative configuration therebetween identical to that of FIG. 6. FIG. 8A's configuration obtains from reversing the axial retraction of the inner and intermediate sleeve structures 76 and 80, respectively. All elements of apparatus 22 and 72 shown in FIG. 8A occupy the same relative configurations as do the elements illustrated in FIG. 6 with the only difference being tube 20's plastic expansion against aperture wall 66 as shown in FIG. 8B. FIG. 8B illustrates driving element 38 again in axially abutting relationship with tapered component 32 of guide-expander 22. As can be seen in FIG. 8B, O-rings 28 have again contracted to their radial securing size shown in FIGS. 1A and 3 through 6 and are now radially separated from the heretofore plastically expanded tube portion shown in FIGS. 7B and 7C.

Figure 9:
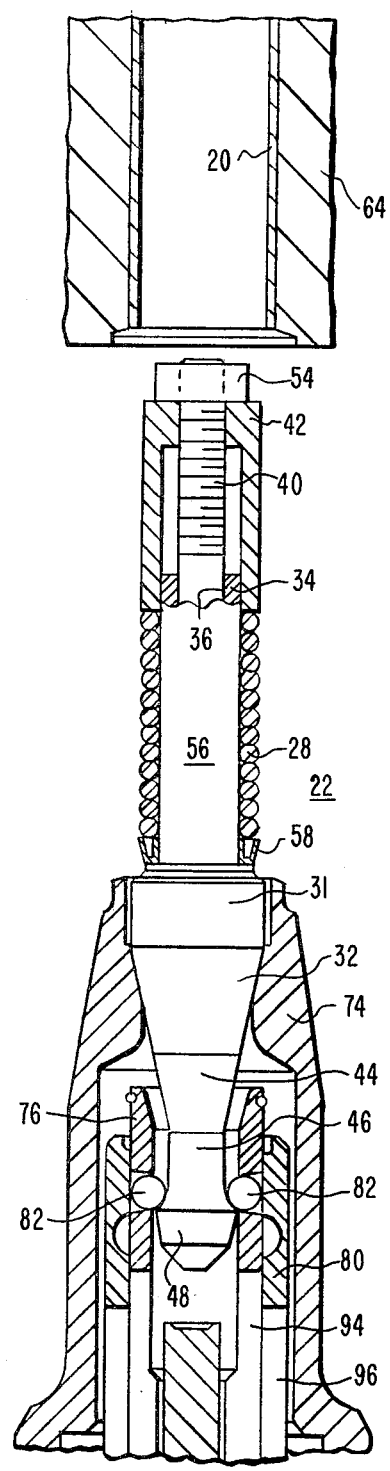

FIG. 9 is a partial sectional view of a portion of apparatus 72 and guide-expander 22 in a withdrawn position from expanded tube 20. Following the configuration of FIGS. 8A and 8B, the entire apparatus 72 is retracted from tube sheet 64 by the supporting Rθ machine with balls 82 remaining radially disposed in their inner, obstructing position. Since outer sleeve structure 74 is retracted with the inner sleeve structure 76, O-rings 28 are not radially expanded against the wall of tube 20 and the coupled guide-expander 22 is easily withdrawn from tube 20.

Figure 10A:
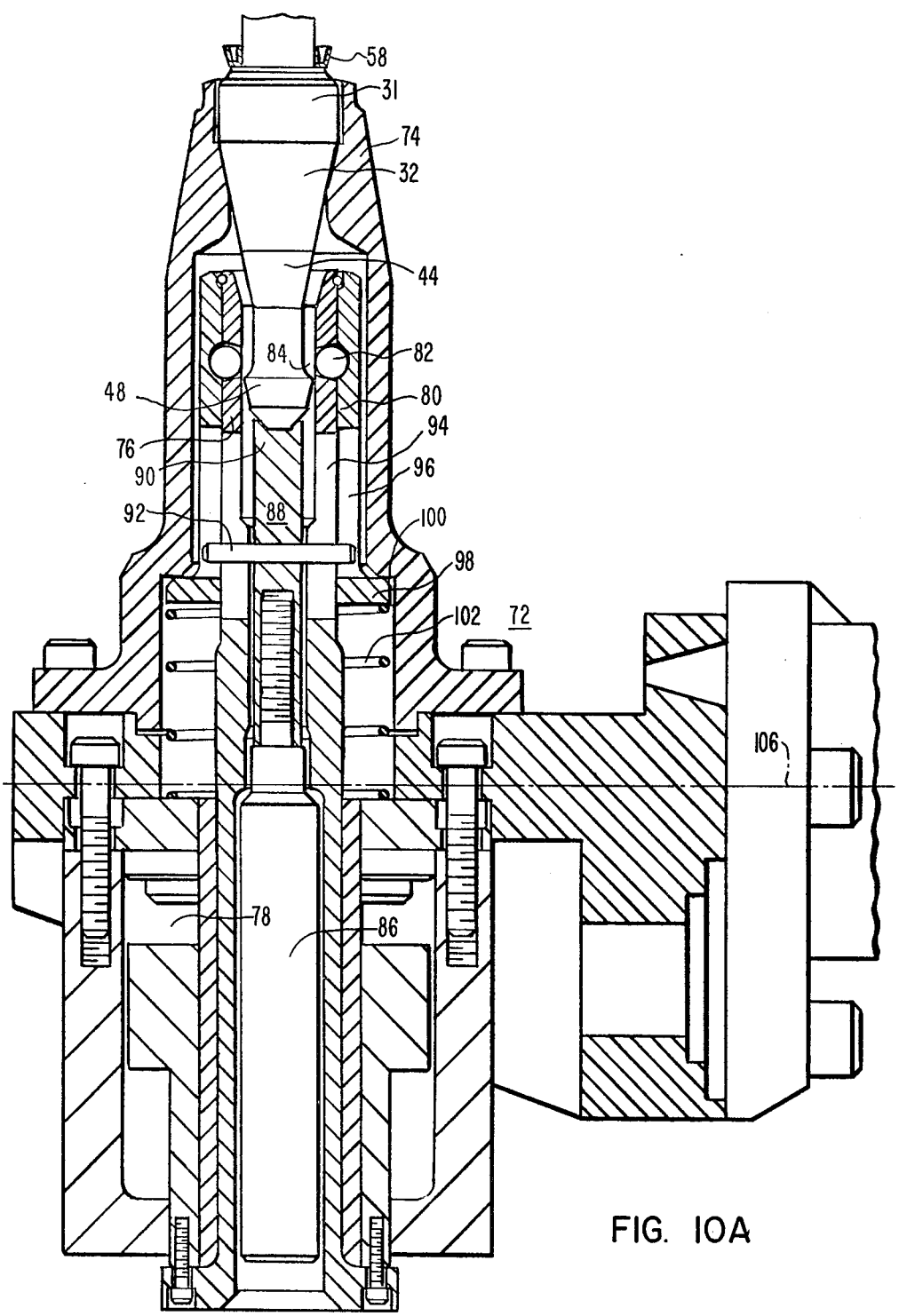
Figure 10B:
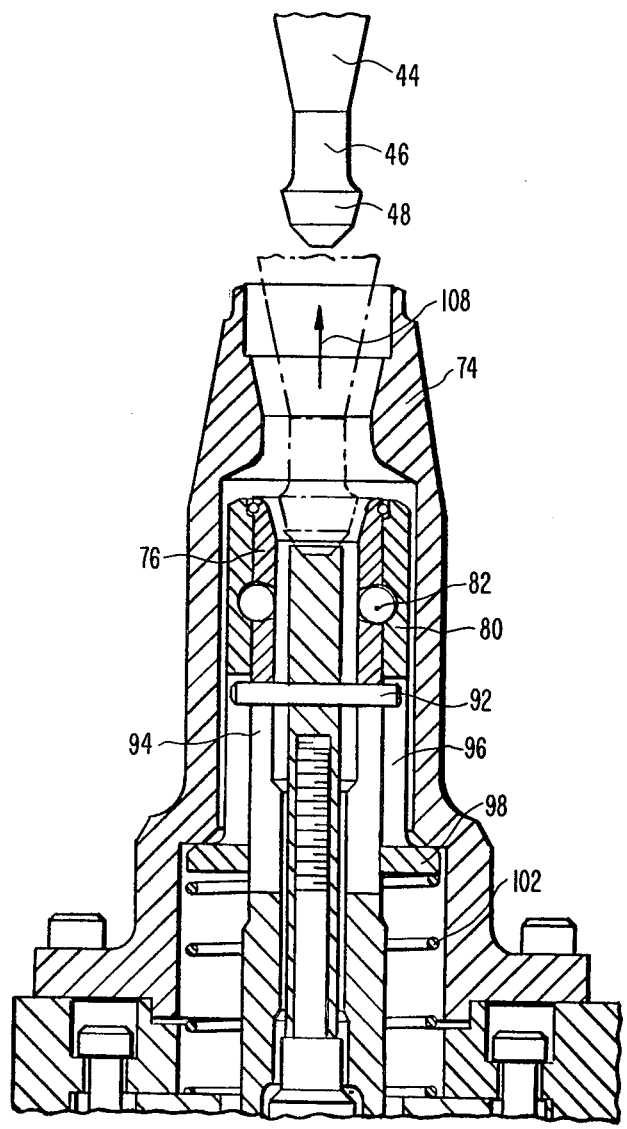
Figure 11:
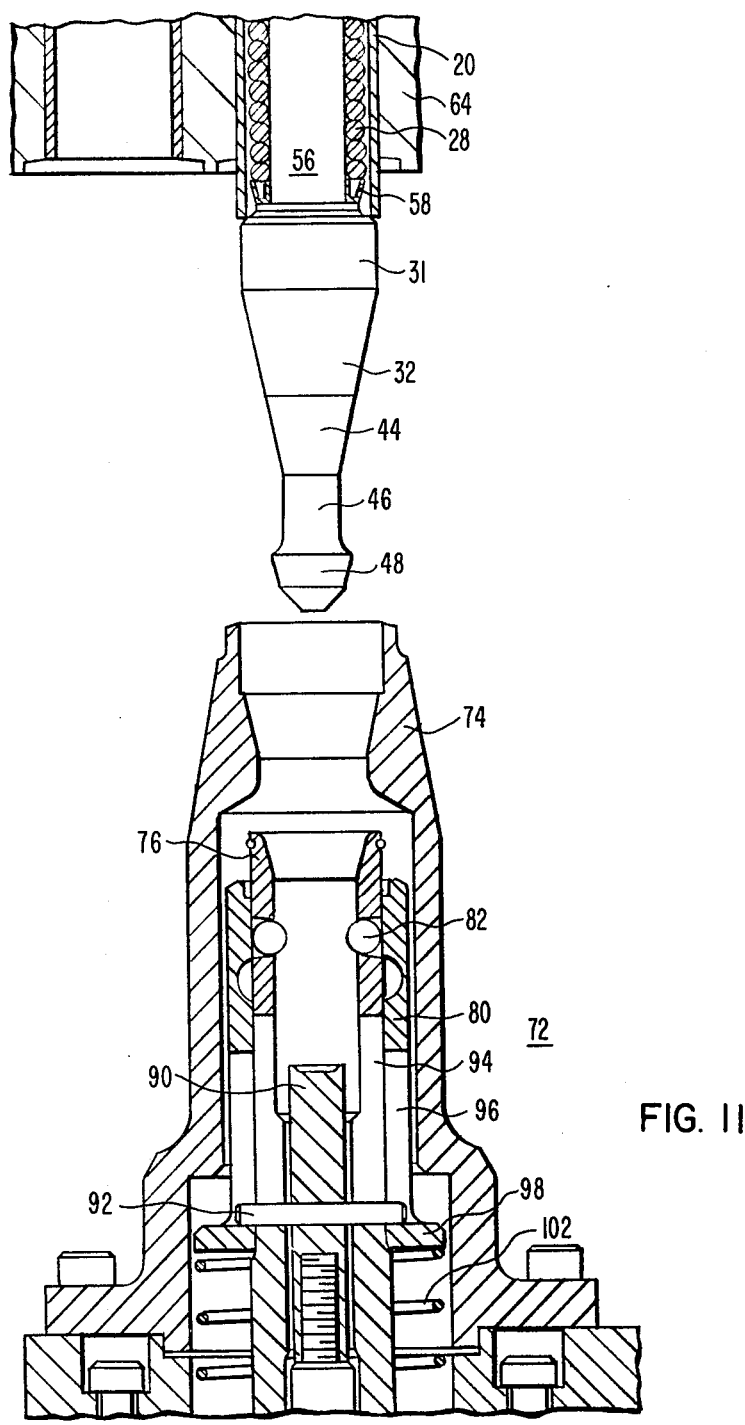

FIGS. 10A and 10B are partial sectional views illustrating the expulsion of guide-expander 22 from actuator-extractor apparatus 72. Upon axial retraction of apparatus 72 and 22 a suitable distance from the tube sheet 64 and other protruding guide-expander apparatus 22, apparatus 72 is preferably rotated at least 90° about axis 106 which is perpendicular to bore 84. Air cylinder 86 axially displaces piston structure 88 toward guide-expander 22. When collar 98 axially engages shoulder 100, the radial openings of the inner and intermediate sleeve structures 76 and 80, respectively, axially align and permit radial displacement of balls 82 to their unobstructing position. Further displacement of piston structure 88 sequentially results in axial abutment of abutting structure 90 with apparatus 22's tip portion 48 as illustrated in FIG. 10A and axial engagement between actuating pin 92 and the extreme boundary of slot 94. Engagement between pin 92 and the boundary of slot 94 ensures axial expulsion of guide expander 22 in the direction shown by arrow 108 in FIG. 10B. Following such expulsion, apparatus 72 is reversibly rotated to its extracting position about axis 106 and locked securely therein. The apparatus 72 is then indexed coaxially with another guide-expander 22 so as to assume the configuration shown in FIG. 4A in which collar 98 is engaged with shoulder 100 and balls 82 occupy their radially outer, unobstructing position in preparation for receiving the apparatus 22's driving portion 38 into bore 84.

When tubes 20 have U-shapes, two $R\theta$ machines and associated actuator-extractor apparatus 72 are preferably disposed adjacent corresponding legs of the same U-tube. Only one leg of the U-tube should be swaged and properly configured relative to the tube sheet 64 at one time since the legs of a U-tube will not protrude through tube sheet 64 on the primary side 70 precisely the same distance. Since it is easier to push a tube leg 20 into proper configuration with tube sheet 64 from the primary side 70, the shorter protruding tube leg 20 of the U-tube is chosen after measurement thereof for proceeding with sequential steps as indicated at FIGS. 4A through 10B. Selection of the shorter protruding tube leg of the U-tube prevents that leg and attached guide-expander 22 from being withdrawn into its aperture 66 when the longer protruding tube leg is axially displaced into the desired configuration with tube sheet 64 as indicated in FIG. 6. After the shorter protruding tube leg has been properly configured and expanded, the longer protruding tube leg can be properly configured and expanded without fear of the aforementioned tube leg withdrawal. Although only one tube end has been described, it is to be understood that U-tubes have two ends which each appear the same as the described end. Subscribing to the aforementioned procedure for installing U-tubes necessitates sequential reference to the same Figures showing a single tube end.

It will now be apparent that a multi-duty tube guide-expander has been provided in which axial compression is utilized to produce radial expansion of a housing tube 20 into contact with the wall bounding a tube sheet aperture 66. Actuation of the guide-expander apparatus 22 and extraction thereof is facilitated by apparatus 72 which is engageable with the guide-expander 22 and can relatively axially displace at least two portions of the guide-expander 22 so as to radially expand it. Following actuation of the guide-expander apparatus 22, the extractor apparatus 22 extracts the guide-expander apparatus from the plastically expanded tube and expels it preparatory to its subsequent collection and removal. The actuator-extraction apparatus 72 can then be indexed to another guide-expander apparatus 22. While the guide-expander and actuator-extractor apparatus have been described in conjunction with vertically disposed tubes of a nuclear steam generator, it is to be understood that the aforementioned apparatus and method for utilizing the same equally facilitates tube installation in conventional, non-nuclear heat exchangers whose tubes are horizontally configured. $R\theta$ machines as previously described provide the necessary support and manipulation of the actuator-extractor apparatus 72 and enable its indexation under suitable guide-expanders 22 protruding through tube sheet 64. Cooperative use of such apparatus permits multiple operations with a single tool, thus eliminating the need for tool changes, workmen interference, and/or exposure of the workmen to the environment surrounding the tube's primary side 70.

We claim:

1. An apparatus for actuating and extracting a tube guide-expander device installed in and releasably retained in the end of a tube extending through a tubesheet aperture, the guide-expander having relatively displaceable first and second compression structures which are both partially housed in the tube, the first and second compression structures respectively include a thrust portion and an axially displaceable driving element, the thrust portion being disposed between the tube end and the driving element in axially abutting relationship with the tube end, the first and second compression structures having radial expansion means disposed therebetween within the tube for radially expanding the tube in response to axial compression thereof, said actuating and extracting apparatus comprising:

means for grasping the driving element;

means for axially displacing the grasping means; and selectively actuatable means for maintaining a fixed configuration between the abutting thrust portion-tube end and the tubesheet when the driving element is grasped by said grasping means and axially displaced relative thereto.

2. The apparatus of claim 1, said configuration maintaining means comprising:

an outer sleeve structure which is axially displaceable between positions of engagement and disengagement with the device's thrust portion and tubesheet.

3. The apparatus of claim 1, said axial displacing means comprising:

an axially displaceable inner sleeve structure having an internal bore into which the device's driving element is receivable.

4. The apparatus of claim 3, said grasping means comprising:

a plurality of radial openings in said inner sleeve structure with radially inner and outer axial expanses;

a plurality of balls selectively displaceable in said openings between an inner position radially protruding into the inner sleeve structure's bore in overlapping relation with the driving element and an outer position radially separated from the driving element; and means for selectively radially displacing said balls.

5. The apparatus of claim 4 wherein said inner sleeve structure's openings' radially inner axial expanse is less than the openings' radially outer axial expanse.

6. The apparatus of claim 5 wherein each of said ball's diameter is greater than the corresponding radial openings' inner axial expanse.

7. The apparatus of claim 4, said radial displacing means comprising:

an axially displaceable intermediate sleeve structure concentrically disposed about said inner sleeve structure, said intermediate sleeve structure having radial openings which, when aligned with said inner sleeve structure's openings', cooperate therewith to radially outwardly receive at least a portion of the balls and provide an axially unobstructing configuration for the device's driving element.

8. The apparatus of claim 7, further comprising:

means for axially displacing said intermediate sleeve structure.

9. The apparatus of claim 8, said intermediate sleeve structure's axial displacing means comprising:
- a spring in engagement with said intermediate sleeve structure to bias said intermediate sleeve structure in a first axial direction; and
- a hydraulic cylinder apparatus for selectively opposing in a second direction said spring's biasing force.

10. The apparatus of claim 9 wherein said inner and intermediate sleeve structures include axially elongated slots.

11. The apparatus of claim 10, said hydraulic cylinder apparatus further comprising:
- an actuating pin extending through said slots, said pin regulating the axial displacement of said intermediate sleeve structure for a predetermined distance in the first direction, said pin's axial displacement in the first and second directions being limited by the axial extent of said inner sleeve structure's slots.

12. The apparatus of claim 7 further comprising:
- radially outwardly protruding collar attached to said intermediate sleeve structure; and
- a stopping shoulder axially engageable with said collar to therebeyond restrain the intermediate sleeve structure's axial displacement in the first direction, said stopping shoulder being attached to the configuration maintaining means and providing an axially-aligned radial opening configuration between said inner and intermediate sleeve structures.

13. The apparatus of claim 3 further comprising:
- means for ejecting the device from said grasping means after the device's extraction from the tubesheet.

14. The apparatus of claim 13, said ejecting means comprising:
- axially displaceable abutting means disposed in said inner sleeve structure's bore for expelling the device therefrom.

* * * * *